United States Patent [19]
Bräuninger et al.

[11] Patent Number: 5,079,710
[45] Date of Patent: Jan. 7, 1992

[54] METHOD AND APPARATUS FOR LIMITING ROAD SPEED IN A MOTOR EHICLE HAVING AN ELECTRICALLY CONTROLLED DIESEL ENGINE

[75] Inventors: Jürgen Bräuninger, Stuttgart; Dieter Heck, Rutesheim; Josef Wirz, Stuttgart; Dieter Seher, Ilsfeld, all of Fed. Rep. of Germany

[73] Assignee: Robert Bosch GmbH, Stuttgart, Fed. Rep. of Germany

[21] Appl. No.: 551,453

[22] Filed: Jul. 12, 1990

[30] Foreign Application Priority Data

Jul. 12, 1989 [DE] Fed. Rep. of Germany ....... 3922946

[51] Int. Cl.$^5$ .............. F16D 23/00; F16D 47/00; B60K 31/04; F02D 31/00
[52] U.S. Cl. ................. 364/431.07; 123/350; 123/357; 180/179; 192/0.084; 192/0.096; 364/426.04
[58] Field of Search ........ 364/426.04, 431.07, 364/424.1; 74/857, 859; 192/0.076, 0.084, 0.09, 0.096; 123/349–351, 357; 180/170, 179

[56] References Cited

U.S. PATENT DOCUMENTS

| | | | |
|---|---|---|---|
| 3,601,103 | 8/1971 | Swiden | 123/351 |
| 4,120,373 | 10/1978 | Fleischer | 180/179 |
| 4,355,607 | 10/1982 | Blaney | 364/426.04 X |
| 4,472,777 | 9/1984 | Youngblood | 364/431.07 |
| 4,495,457 | 1/1985 | Stahl | 364/424.1 |
| 4,714,144 | 12/1987 | Speranza | 192/0.096 X |
| 4,853,673 | 8/1989 | Kido et al. | 364/424.1 X |
| 4,918,606 | 4/1990 | Ito et al. | 364/424.1 |

Primary Examiner—Parshotam S. Lall
Assistant Examiner—E. J. Pipala
Attorney, Agent, or Firm—Walter Ottesen

[57] ABSTRACT

The invention relates to a method and apparatus for limiting road speed in electrically controlled diesel engines. The output signal of the road-speed transducer or, if the road-speed transducer is defective, the output signal of the engine speed transducer is evaluated by means of pregiven thresholds. In the presence of a simultaneous clutch signal and a quantity signal which is less than a pregiven injection quantity a waiting time is made available in advance of the quantity reduction so that when the clutch is actuated, fuel can be metered when the clutch pedal is depressed or the vehicle can be started on a hill. No transmission signal is necessary for limiting road speed whereby manipulations on the road-speed limitation are prevented.

3 Claims, 2 Drawing Sheets

METHOD AND APPARATUS FOR LIMITING ROAD SPEED IN A MOTOR EHICLE HAVING AN ELECTRICALLY CONTROLLED DIESEL ENGINE

BACKGROUND OF THE INVENTION

It is known to provide a road-speed limit for diesel engines in order to operate the diesel engine in an ecological and practical manner with respect to engine speed and fuel quantity. In this way, excessive speeds are avoided with the purpose of complying with statutory requirements and providing economical operation.

For this purpose, it is customary to provide a road-speed transducer which generates a corresponding road-speed signal and, together with other signals, interrupts or reduces the fuel metered to the engine when a pregiven threshold of maximum speed is exceeded. As a further signal, it is customary to use a signal originating from the transmission. This signal causes problems in that it can have the effect of acting as a transmission switch in neutral position and can cancel the road-speed limitation effect.

In view of the above, it cannot be excluded that by appropriate manipulation in this region, an evaluation of the signal is only possible in a deceptive manner in that the system receives the signal that the transmission switch is in the neutral position and this disables the road-speed limitation and therefore can lead to a possible dangerous driving situation as well as to technical defects. The manipulation in the above-mentioned region can be provided by a simple short-circuit of the transmission switch on the wire harness plug.

SUMMARY OF THE INVENTION

It is an object of the invention to provide a speed limitation which is safe from manipulation as far as possible. It is a further object of the invention to provide such a road-speed limitation which remains functional even when the road-speed signal is defective.

The method and apparatus of the invention provide protection against an arbitrary intervention and maintain the functional reliability even when the road-speed signal is defective. Only a clutch signal is needed as a peripheral signal which in any event is evaluated for the conventional electronic diesel control (EDC-systems).

For this reason, the invention eliminates the arrangement of an additional plug location for the transmission switch signal previously required in the control apparatus.

No further signals are needed beyond this coupling signal which would not otherwise be available or be required in the EDC control apparatus. It is furthermore advantageous that the road-speed limitation according to the invention does not have any disadvantageous influences in other possible driving situations. The metering of fuel for reving up the engine when actuating the clutch pedal is possible in every desired situation. In addition, starting up on a hill without problems is assured even when the road-speed signal is defective.

A special advantage of the invention is the simultaneous evaluation of the injected quantity and the comparison thereof with a threshold value so that it can be determined whether or not a gear shifting operation is present for which specific over-speeds and speeds in excess of speed limit values can occur. The above-mentioned fuel quantity is metered to the diesel engine at the instant of the occurrence of the clutch signal. The invention reacts differently in dependence upon the comparison.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
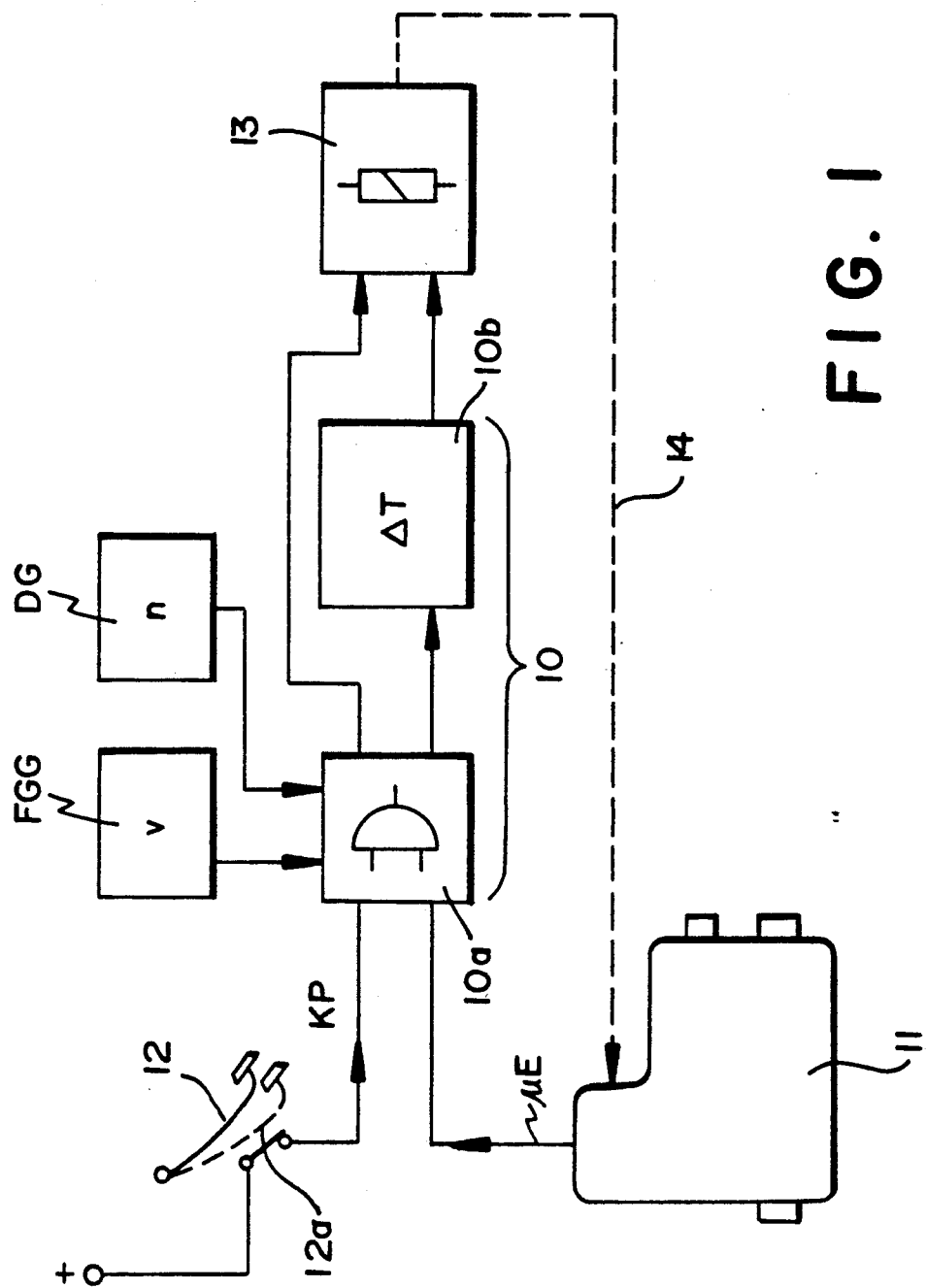
FIG. 1 is a schematic showing an analog possibility for road-speed limitation; and, FIG. 2 is a flowchart for road-speed limitation.

The invention involves limiting the maximum road speed or the maximum engine speed depending on whether or not a road-speed signal is available. In this connection, it must always be considered whether at this instant a transmission actuation takes place, that is, whether the driver has depressed the clutch pedal and has correspondingly reduced the metered quantity of fuel (load drop). In the event of a transmission actuation, the driver has an additional time interval available in order to depress the accelerator pedal without activating the limitation.

In the illustrated embodiment of the invention shown in the drawings, it is understood that the individual components and blocks can be designed in analog, digital or even hybrid technology or can comprise, entirely or partially combined appropriate areas of program-controlled digital systems, that is, microcomputers, microprocessors or the like. The flowchart shows that the present invention can be realized with various external sensors and its technical function can be realized in a time sequence of a program of an EDC system.

Referring to the drawing, reference numeral 10 represents an electronic logic circuit, a microprocessor or a computer. The microprocessor 10 receives a road-speed signal v from a road-speed transducer FGG and an engine-speed signal n from an engine-speed transducer DG. In addition, the central logic circuit is supplied with an injection quantity signal ME for example from the area of the diesel fuel pump 11 as well as a coupling signal KP from the area of the clutch pedal 12 having switch 12a corresponding thereto.

The logic circuit 10 includes a plurality of first switching means 10a which combines the two signals KP (clutch actuated) and the injection quantity signal ME in the manner of an AND-function. In dependence upon whether a road-speed transducer signal in the form of a speed signal v is present or whether the engine speed signal n is to be processed, the logic circuit 10 decides (when the condition $v > v_{max}$ or $n > n_{max}$ is exceeded) whether an additional time interval has to be made available for the transmission actuation including fuel metered when the clutch pedal is depressed until regulation occurs or no intervention takes place, that is, the metered injection quantity is reduced and for this purpose, a time component 10b is provided downstream. A regulating order is issued to an output actuator represented schematically in the drawing at reference numeral 13 and this output actuator acts, in the manner represented by the dashed connecting line 14, on the diesel injection pump 11.

Figure 2:
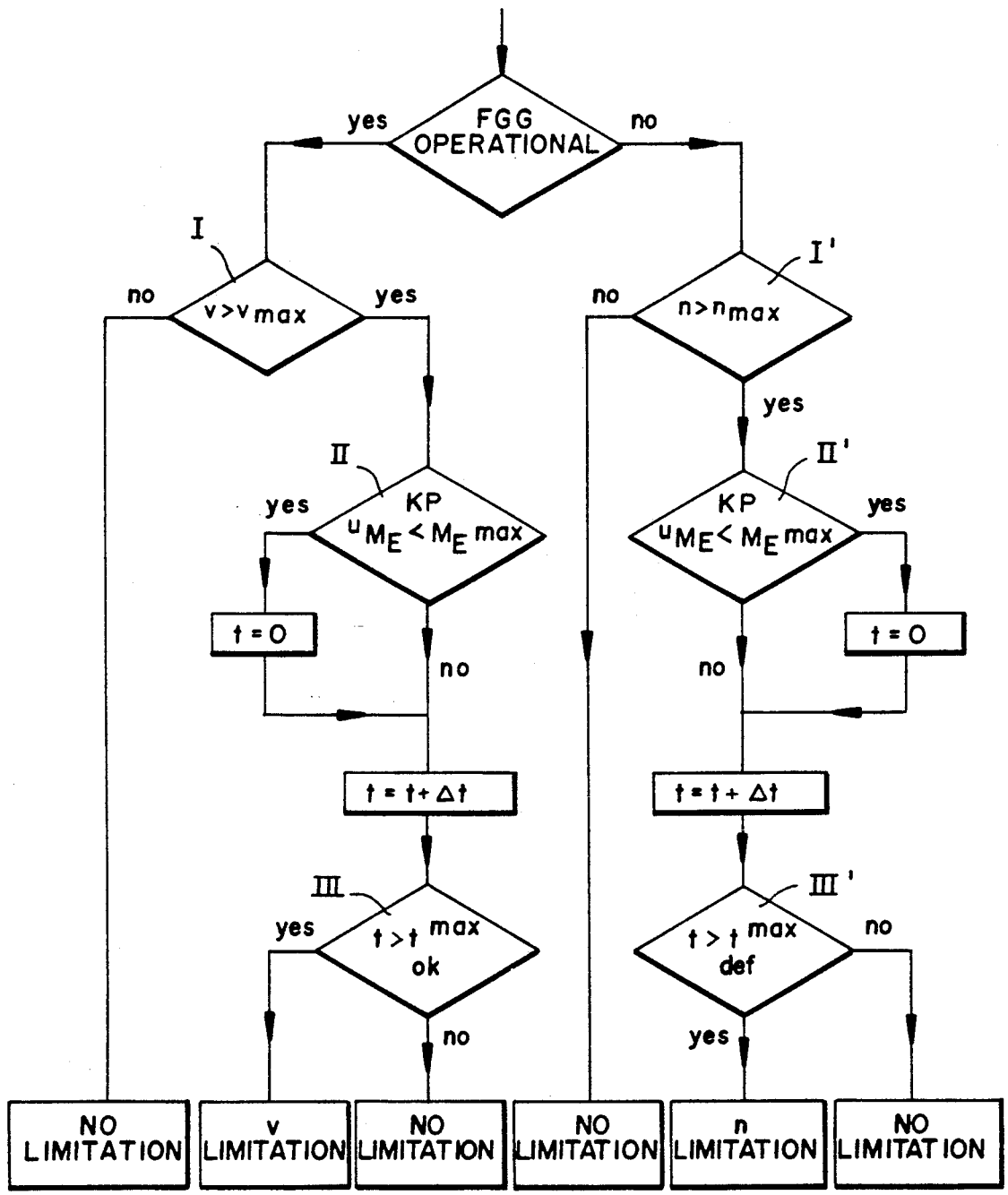

The function made possible by the invention runs through a sequence as shown by the flowchart in FIG. 2.

In the flowchart of FIG. 2, the following cases can be distinguished:

1. A road-speed signal is present when the road-speed transducer is operational; then the left branch of the flowchart becomes operational and a check is made in function block I as to whether the highest speed $v_{max}$ has been exceeded. If this is the case, then consideration must be given as to whether the driver wants to shift back the transmission at this time point; for this purpose, a decision block II is provided at which it is recognized whether a clutch signal KP is present and simultaneously the metered quantity $M_E$ is reduced, that is, $M_E < M_E^{max}$. If the transmission is shifted down, a determination is made at a further function block III as to whether a pregiven waiting time $t_{ok}^{max}$ has passed when the road-speed transducer is operational. This time is made available to the driver in order to meter fuel when the clutch pedal is depressed. If this time interval is exceeded, a limitation results and if the time interval is not exceeded, then there is no limitation.

For the case wherein the clutch is actuated without providing additional gas during overspeed, an idle regulator provides that the engine does not die.

2. If the road speed signal is not available because the road-speed transducer is defective, then the same function blocks are available in the right branch of the flowchart; however, with the exception that in lieu of road speed, the engine speed n is limited and with the guideline that the waiting time $t_{def}^{max}$ which is here provided is in this case selected to be greater so as to make possible a starting of the vehicle on a hill without difficulty. Such a starting of the vehicle on a hill can only be detected if the road-speed transducer is operational; whereas, if reliance is placed only on the engine speed signal n, the maximum engine speed $n_{max}$ can be exceeded when pressing the accelerator pedal excessively at standstill.

In the following, the variables included in the flowchart are defined:

$v_{max}$ = permitted highest speed $n_{max}$ = rotational speed at which $v_{max}$ is reached in the highest gear $M_E^{max}$ = injection quantity which must be less in advance of metering fuel when the clutch pedal is depressed $t_{ok}^{max}$ = waiting time when FGG is operational $t_{def}^{max}$ = waiting time when FGG is defective FGG = road-speed transducer KP = clutch is actuated It is understood that the foregoing description is that of the preferred embodiments of the invention and that various changes and modifications may be made thereto without departing from the spirit and scope of the invention as defined in the appended claims.

What is claimed is:

1. A method for limiting road speed in an electronically controlled diesel engine (EDC), the method comprising the steps of:
    (a) determining an excessive speed ($v > v_{max}$) when the road-speed transducer is functionally operational;
    (b) evaluating a clutch signal (KP) together with a fuel injection quantity signal (ME);
    (c) waiting for the passage of a time delay ($t_{ok}^{max}$) which makes possible a metering of fuel when the clutch pedal is depressed;
    (d) reducing fuel quantity after the time delay ($t_{ok}^{max}$) has passed and a continued excessive speed exits;
    (e) determining the presence of speed in excess of a highest speed ($n > n_{max}$) for a defective road-speed transducer (FGG) and repeating steps (b) to (d).

2. The method of claim 1, wherein, in the case of a defective road-speed transducer (FGG), the additional time delay in the form of a waiting time ($t_{def}^{max}$) is selected to be greater than the time delay for a functionally operational road-speed transducer in order to make possible a trouble-free start up a hill.

3. Apparatus for limiting road speed in an electronically controlled diesel engine (EDC) having a clutch signal transducer for supplying a clutch signal (KP), the apparatus comprising:

logic control circuit means for evaluating said clutch signal (KP) together with a fuel injection quantity signal (ME);

road-speed transducer means for supplying a road-speed signal (v) to said circuit means;

engine-speed transducer means for supplying an engine-speed signal (n) to said circuit means;

said logic control circuit means including comparison means for evaluating said clutch signal (KP) and said fuel injection quantity signal in combination with a signal defining a condition wherein said road-speed signal (v) exceeds a road-speed threshold or said engine-speed signal exceeds an engine-speed threshold; and, time-delay circuit means connected downstream of said comparison means for receiving a drive signal from said comparison means for reducing the injected quantity of fuel when the pregiven time delay ($t_{ok}^{max}$; $t_{def}^{max}$) is exceeded.

* * * * *

UNITED STATES PATENT AND TRADEMARK OFFICE
CERTIFICATE OF CORRECTION

PATENT NO. : 5,079,710

DATED : January 7, 1992

INVENTOR(S) : Jürgen Bräuninger, Dieter Heck, Josef Wirz and Dieter Seher

It is certified that error appears in the above-identified patent and that said Letters Patent is hereby corrected as shown below:

In the title page, in the title, line 3: delete "EHICLE" and substitute -- VEHICLE -- therefor.

In column 1, line 2: delete "EHICLE" and substitute -- VEHICLE -- therefor.

In column 4, line 17: delete "exits" and substitute -- exists -- therefor.

Signed and Sealed this

Thirty-first Day of August, 1993

Attest:

BRUCE LEHMAN

Attesting Officer

Commissioner of Patents and Trademarks